United States Patent [19]

Kobayashi et al.

[11] Patent Number: 5,742,402

[45] Date of Patent: Apr. 21, 1998

[54] COMMUNICATION APPARATUS

[75] Inventors: Makoto Kobayashi; Shinichiro Kohri; Koichiro Ohtsuka, all of Kawasaki, Japan

[73] Assignee: Canon Kabushiki Kaisha, Japan

[21] Appl. No.: 886,005

[22] Filed: Jul. 3, 1997

Related U.S. Application Data

[63] Continuation of Ser. No. 423,096, Apr. 18, 1995, abandoned.

[30] Foreign Application Priority Data

Apr. 18, 1994 [JP] Japan .................... 6-103382

[51] Int. Cl.$^6$ ........................................ H04N 1/00
[52] U.S. Cl. ................ 358/404; 358/406; 358/437
[58] Field of Search ........................ 358/400, 404, 358/405, 406, 434, 35, 36, 37, 38, 39; 379/100

[56] References Cited

U.S. PATENT DOCUMENTS

| | | | |
|---|---|---|---|
| 5,091,790 | 2/1992 | Silverberg | 358/434 |
| 5,130,818 | 7/1992 | Tadokoro | 358/407 |
| 5,283,665 | 2/1994 | Ogata | 358/434 |
| 5,331,424 | 7/1994 | Matsui et al. | 358/404 |

FOREIGN PATENT DOCUMENTS

| | | | |
|---|---|---|---|
| 0183874 | 9/1985 | Japan | 358/404 |
| 0215154 | 8/1989 | Japan | 358/404 |

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

A facsimile apparatus and a facsimile communication method prevent the termination of communication in error due to memory capacity shortage when confidential communication or relay designation communication is effected by using a sub-address additionally recommended by the CCITT/T.30. When a remaining capacity of an image memory is smaller than a preset threshold, sub-address control information representing the invalidity of the sub-address is stored in sub-address control memory means. As a result, when an initial identification signal or a send command signal is sent to a destination station, a bit indicating that the sub-address is valid is sent without being set. Namely, the invalidity of the sub-address function is informed to the destination station. Thus, the confidential reception or the relay designation reception using the sub-address is not accepted and the termination of the communication in error due to the memory capacity shortage is avoided.

22 Claims, 5 Drawing Sheets

5,742,402

1

COMMUNICATION APPARATUS

This application is a continuation of application Ser. No. 08/423,096, filed Apr. 18, 1995, now abandoned.

BACKGROUND OF THE INVENTION

1. Field of the Invention

The present invention relates to a facsimile apparatus and a facsimile communication method which allow confidential communication and relay designation communication by using a sub-address additionally recommended by the CCITT/T.30.

2. Related Background Art

A facsimile apparatus for confidential communication and relay designation communication by setting a confidential box number or a relay group number in the sub-address additionally recommended by the CCITT/T.30 (Protocol for document facsimile transmission in a public switching telephone network) has been known.

The facsimile apparatus of this type comprises a transmitter/receiver unit for transmitting and receiving image information to and from a destination station through a communication line, an image processing unit for compressing and decompressing an image, a read unit for reading a document sheet, an image memory for storing a received image and a read image and managed by a box number, a console unit for carrying out various operation for the facsimile communication and a print unit for printing the received image.

When the confidential communication, for example, is to be made by the facsimile apparatus, a called station (a receiving station) sets the bit 49 indicating the validity of a sub-address to DIS (initial identification signal) if the sub-address function is valid and sends it to a calling station. When the calling station confirms that the received DIS includes the bit 49, it sends a transmission image together with a sub-address designating a confidential box number to the called station.

The called station decodes the sub-address sent from the calling station to identify the confidential box number, and stores the received image in an area of the image memory corresponding to the number.

However, in the prior art facsimile apparatus, even if the remaining capacity of the image memory available for storing the received image is small in the receiving station, the receiving station accepts the next confidential reception or relay destination reception. In this case, the memory capacity is exhausted during the reception and a communication error occurs and the previous communication is wasted.

SUMMARY OF THE INVENTION

It is an object of the present invention to improve a communication apparatus.

It is another object of the present invention to provide a communication apparatus which selectively declares the presence or absence of a predetermined function depending on whether a predetermined condition is met or not.

It is still another object of the present invention to provides a facsimile apparatus which prevents the communication from being terminated by a memory capacity shortage during the confidential communication or the relay designation communication by using the sub-address additionally recommended by the CCITT/T.30.

2

Figure 2:
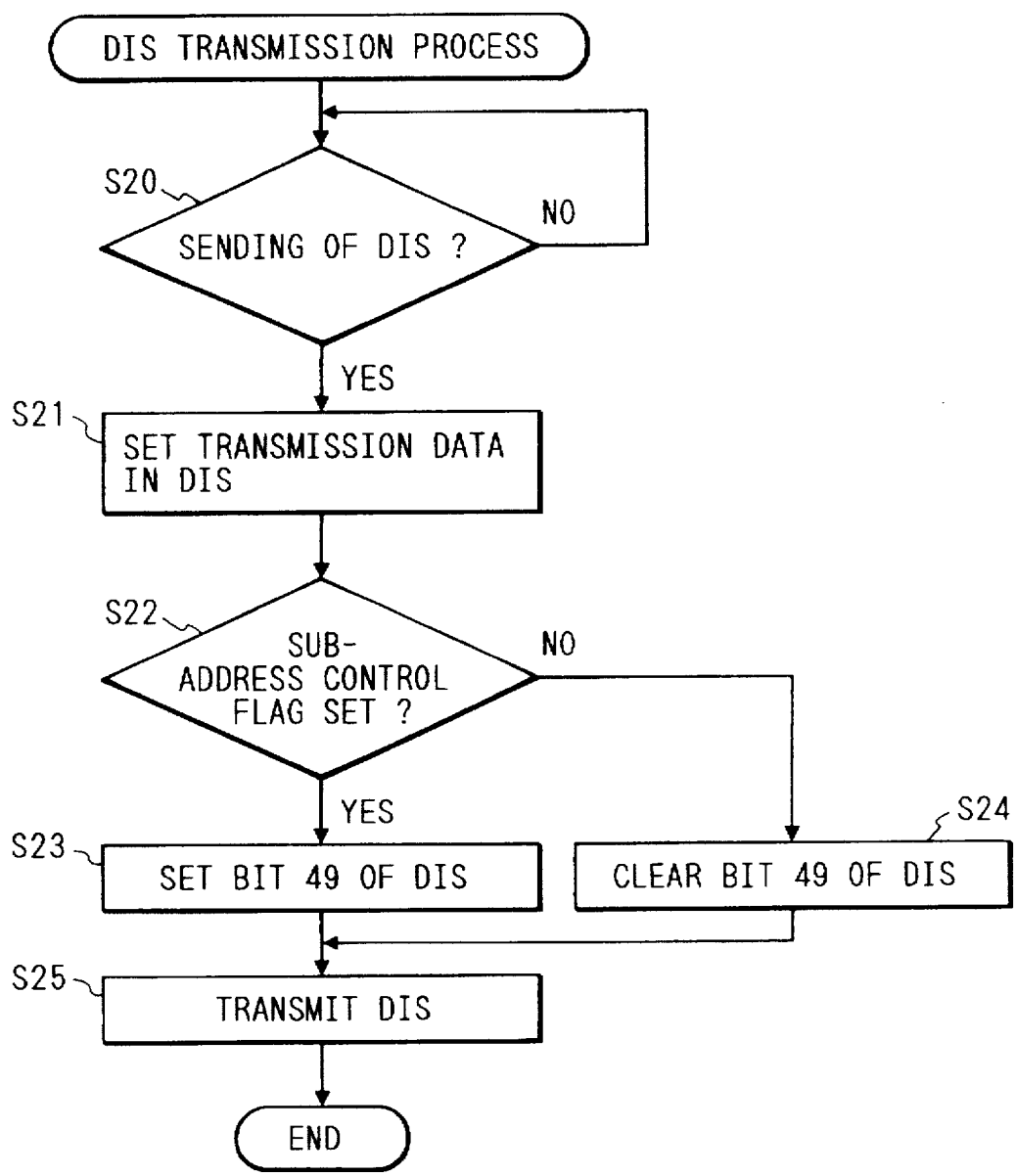
Figure 3:
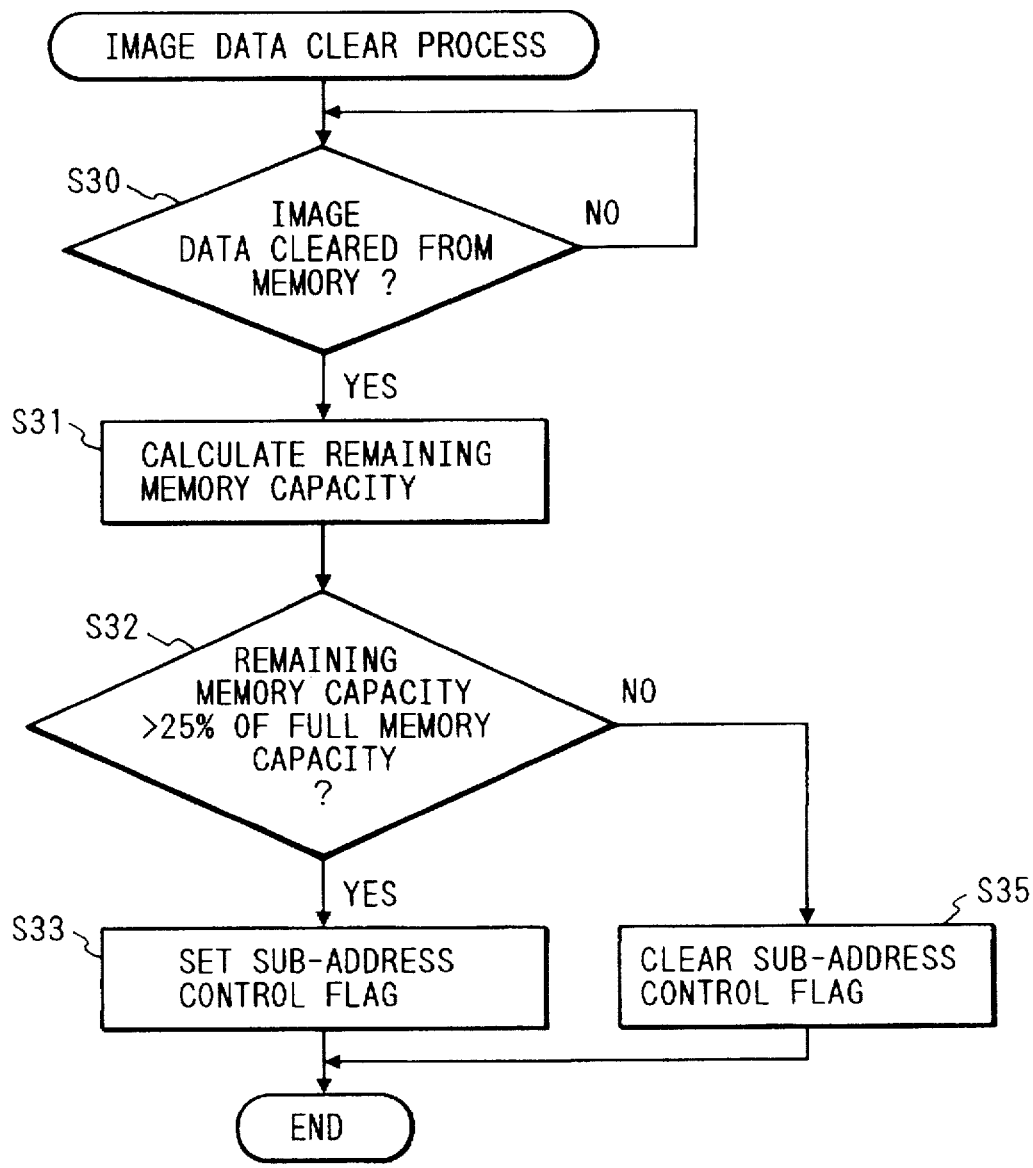
Figure 4:
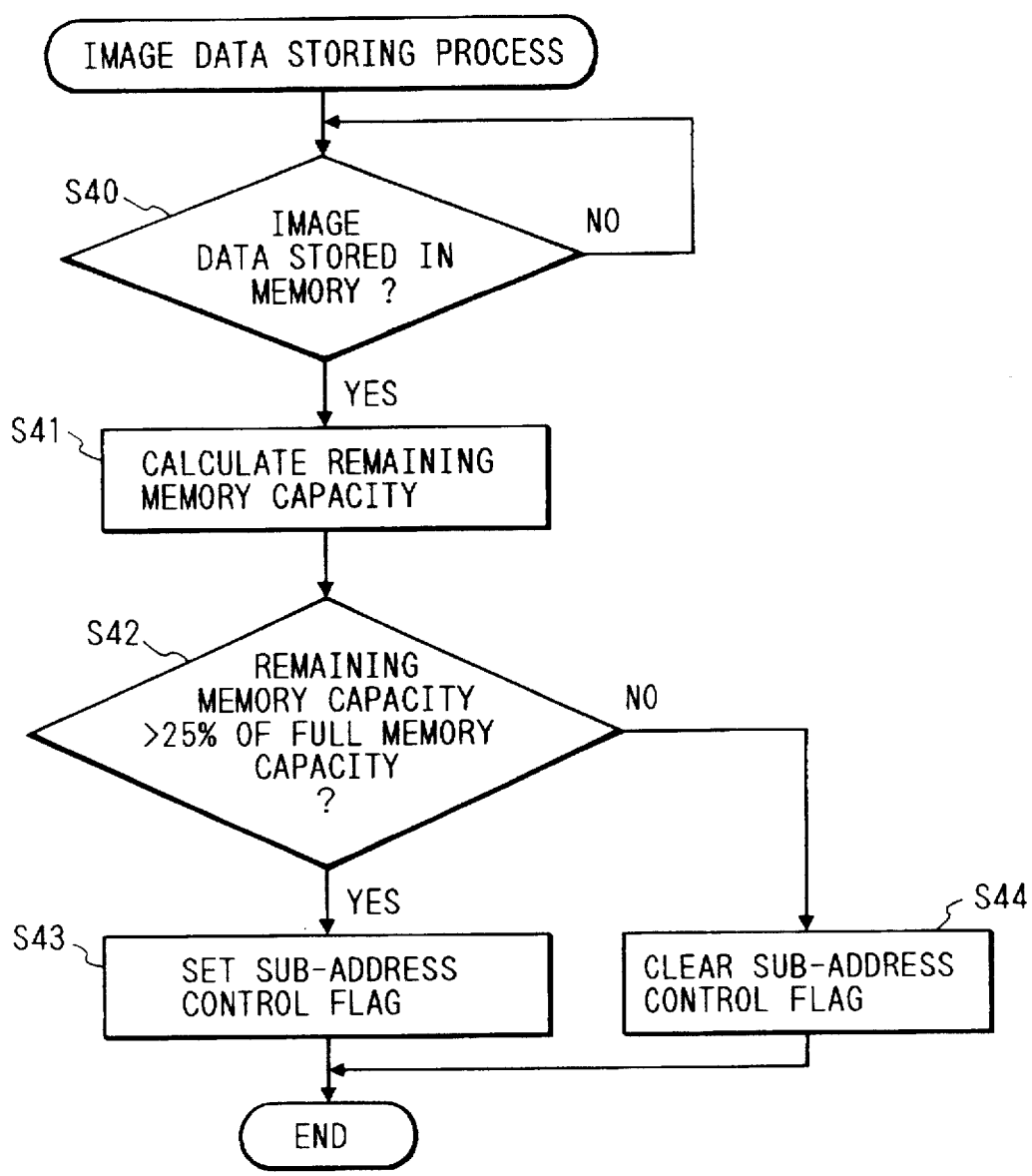
Figure 5:
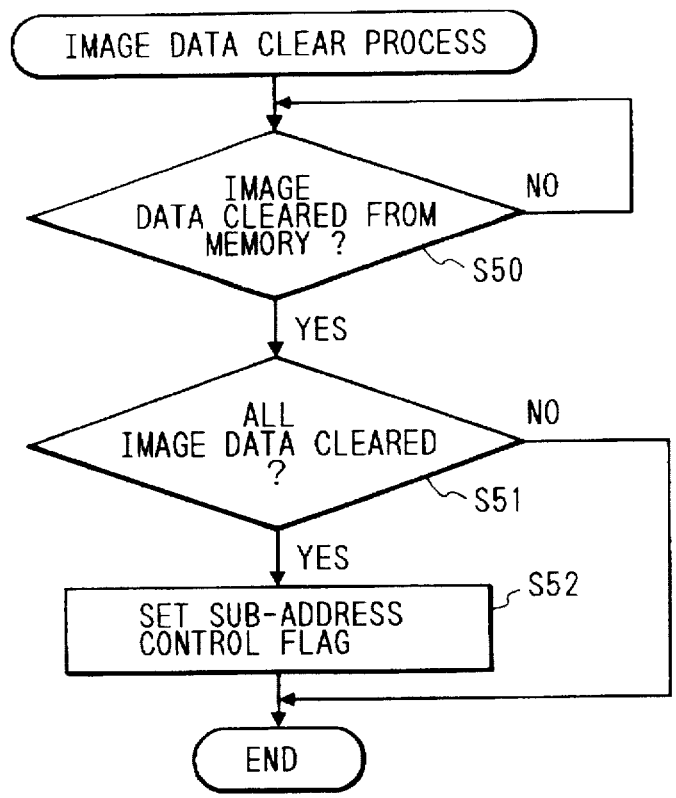
Figure 6:
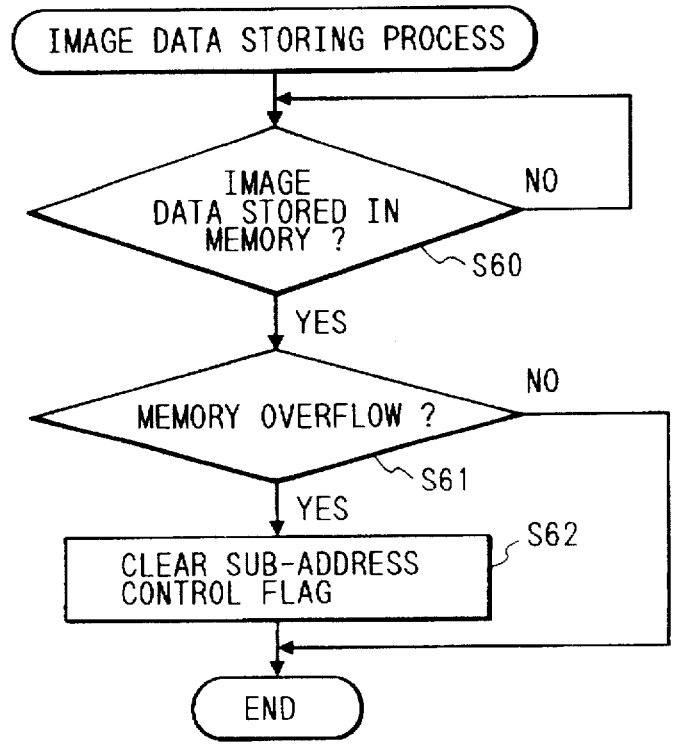

FIG. 2 shows a flow chart of a DIS transmission process in a receiving station in the first embodiment, FIG. 3 shows a flow chart of a process in setting a sub-address control flag in the first embodiment, FIG. 4 shows a flow chart of a process in clearing the sub-address control flag in the first embodiment, FIG. 5 shows a flow chart of a process in setting the sub-address control flag in a second embodiment, and FIG. 6 shows a flow chart of a process in clearing the sub-address control flag in the second embodiment.

DETAILED DESCRIPTION OF THE PREFERRED EMBODIMENTS

An embodiment of the present invention is now explained in conjunction with the accompanying drawings.

Figure 1:
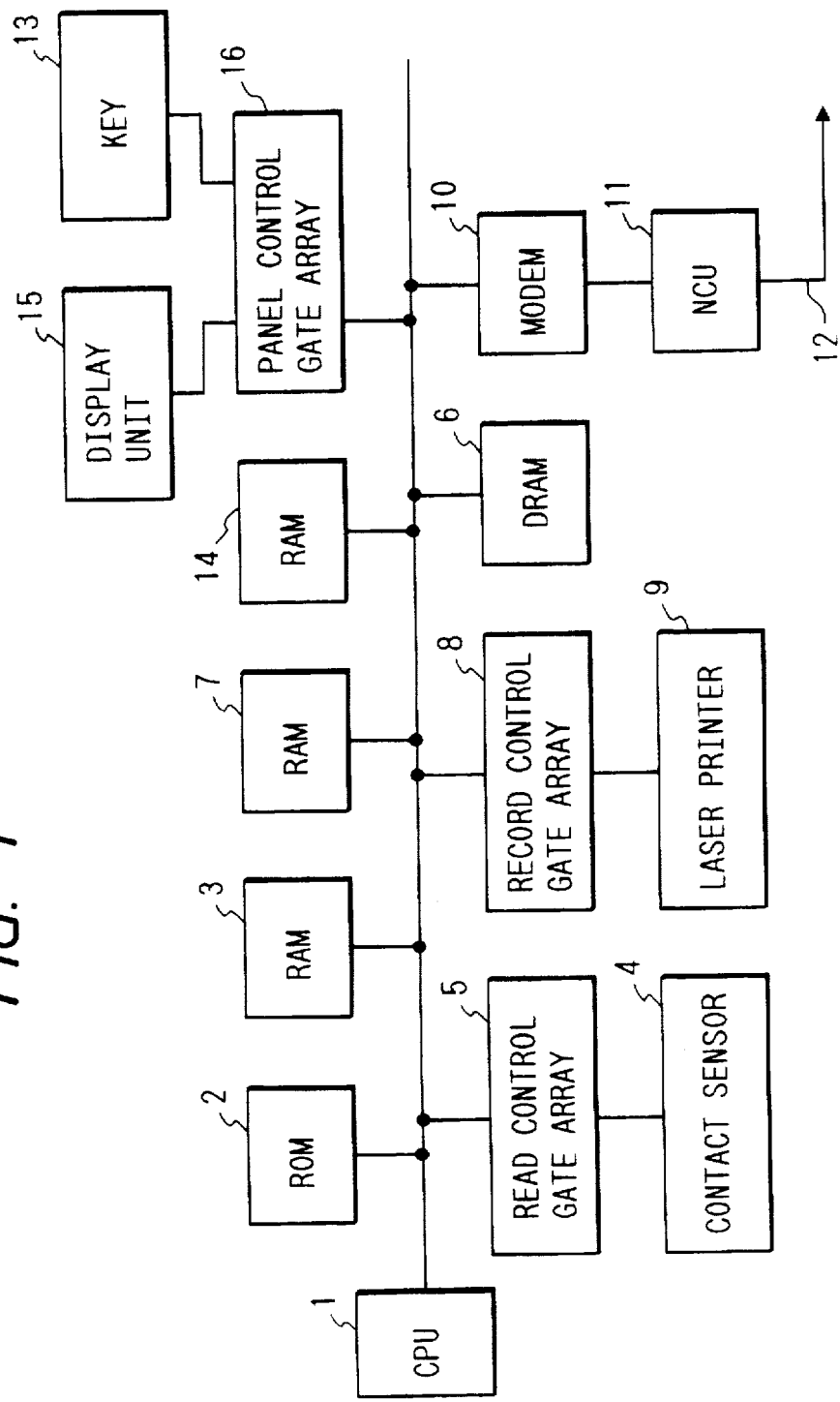
FIG. 1 shows a block diagram of a schematic configuration of a first embodiment of a facsimile. apparatus of the present invention.

FIG. 1 shows a block diagram of a schematic configuration of a first embodiment of the facsimile apparatus of the present invention.

Numeral 1 denotes a central processing unit (CPU) which controls the entire apparatus in accordance with a content of a program (including programs shown in flow charts of FIGS. 2 to 4) stored in a ROM 2. A RAM 3 may be used as a work area as required. A document sheet is read by a contact sensor 4 and it is encoded and compressed by a read control gate array 5 and stored in an image memory (DRAM) 6. Image control information such as an accept number, address information, number of pages and storing image memory block information (such as a memory box number for managing the image memory 6) is stored in a RAM 7.

The image stored in the image memory 6 is decompression-decoded by a record control gate array 8 and outputted to a record sheet by a laser printer 9. It is also digital-analog modulated (PM-AM modulated) by a modem 10 and sent out to a communication line 12 through a line switching NCU (network control unit) 11.

The received data is applied to the modem 10 through the NCU 11 and demodulated, and decompression-decoded to check an image error, and if it is correct, it is compression-decoded and stored in the image memory 6. The image management information is stored in the RAM 7.

An operator depresses a key 13 to indicate or set various operations. The content thereof is held in a RAM 14 and may be confirmed by a display 15 such as a liquid crystal display. The CPU 1 detects the input data from the key 13 through a panel control gate array 16 and displays necessary data on the display 15.

The CPU 1 has a function to store a sub-address control flag (sub-address control information) indicating the validity/invalidity of the sub-address additionally recommended by the CCITT/T.30 as well as a function to decode (or analize) the sub-address sent from the destination station to derive the memory box number when the sub-address is valid and a function to store the received image in the image memory 6 corresponding to the memory box number derived by the decoding function.

An operation for the confidential communication by using the sub-address additionally recommended by the CCITT/T.30 is now explained.

FIG. 2 shows a flow chart of a DIS transmission process in the receiving station in the present embodiment.

In the execution of the facsimile communication protocol, whether the DIS (initial identification signal) is to be transmitted or not is determined (step S20). The DIS indicates a standard CCITT ability of the receiving station and has a predetermined format. If the DIS is to be transmitted, the transmission information is set for the bits of the DIS other than the bit 49 (which indicates the validity of the sub-address) (step S21). This is same for the prior art facsimile apparatus and to inform the function of its own apparatus to the destination station.

Then, whether the sub-address control flag of the CPU 1 is set or not is determined (step S22), and if the sub-address control flag is set, it is determined that the sub-address function is valid and the bit 49 of the DIS is set to inform "the presence of sub-address function" to the destination station (step S23).

On the other hand, when the sub-address control flag is not set (clear), it is determined that the sub-address function is invalid and the bit 49 of DIS is cleared to inform "the absence of sub-address function" to the destination station (step S24).

After the process of the step S23 or the step S24, the DIS is transmitted to the destination station through the NCU 11 (step S25.) and the DIS transmission process in the receiving station is terminated.

FIG. 3 shows a flow chart of a process in clearing the image data stored in the image memory 6.

The process of FIG. 3 is carried out when the read data stored in the image memory 6 or the received image data is cleared. Namely, it is carried out when the image data is cleared from the image memory 6 (step S30 ).

When the image data is cleared from the image memory 6, the unused memory capacity of the image memory 6, that is, the remaining memory capacity is calculated (step S31) and the calculated memory capacity is compared with 25% of the total capacity of the image memory 6 to determine whether the remaining memory capacity is larger than 25% of the total capacity or not (step S32).

If the remaining capacity is larger, the CPU 1 sets the sub-address control flag, stores it and terminates the flow (step S33). If the remaining capacity is smaller, the CPU 1 clears the sub-address control flag and terminates the flow (step S35).

FIG. 4 shows a flow chart of a process in storing the image data in the image memory 6.

The process of FIG. 4 is carried out when the read image data or the received image data is stored in the image memory 6. Namely, it is carried out when the image data is stored in the image memory 6 (step S40).

When the image data is stored in the image memory 6, the remaining capacity of the image memory 6 is calculated (step S41) and the calculated remaining memory capacity is compared with 25% of the total memory capacity to determine whether the remaining memory capacity is smaller than 25% of the total memory capacity or not (step S42).

If the remaining memory capacity is smaller, the sub-address control flag is cleared and stored in the sub-address control memory means and the flow is terminated (step S44). If the remaining memory capacity is larger, the sub-address control flag is left set and the flow is terminated (step S43).

In this manner, the bit 49 of the DIS (the bit declaring the presence or absence of the function to receive the sub-address signal) is set or cleared depending on the remaining memory capacity. When the bit 49 of the DIS is set by the called station, the calling station (partner station) determines that the sub-address function is present in the called station (receiving station) and sends the transmission image to the called station (receiving station) together with the sub-address designating the confidential box number. The called station decodes the sub-address sent from the calling station to identify the confidential box number and stores the received image in a predetermined area of the image memory corresponding to the number.

When the called station does not set the bit 49 to the DIS, the calling station (partner station) determines that the sub-address function is absent in the called station (receiving station) and subsequent corresponding process is carried out. The called station does not accept the confidential reception using the sub-address. In this manner, the termination of the communication in error due to the memory shortage in the receiving station is prevented.

A second embodiment of the present invention is explained. In the first embodiment, the threshold for determining the set/clear of the sub-address control flag is equal (25% of the total capacity of the image memory 6). In the second embodiment, the threshold is changed between the set and the clear.

The second embodiment differs from the first embodiment only in the process of FIG. 4 and others are identical to those of the first embodiment.

FIG. 5 shows a flow chart of a process in clearing the image data stored in the image memory 6.

The process of FIG. 5 is carried out when the read image data or the received image data stored in the image memory 6 is cleared namely, it is carried out when the image data is cleared from the image memory 6 (step S50).

When the image data is cleared from the image memory 6, whether all image data have been cleared or not is checked (step S51). If all image data have been cleared, the sub-address control flag is set and the flow is terminated. If all data have not been cleared, the sub-address control flag is left as it is and the flow is terminated.

FIG. 6 shows a flow chart of a process when the image data is stored in the image memory 6.

The process of FIG. 6 is carried out when the read image data or the received image data is stored in the image memory 6. Namely, it is carried out when the image data is stored in the image memory 6 (step S60).

When the image data is stored in the image memory 6, whether the memory capacity shortage has occurred or not is checked (step S61). If the memory capacity shortage occurs, the sub-address control flag is cleared and the flow is terminated (step S62). If the memory capacity shortage does not occur, the sub-address control flag is left as it is and the flow is terminated.

By the process of the present embodiment, the same effect as that of the first embodiment is attained.

The present invention should not be limited to the above embodiments but various modifications thereof may be made. The modifications may include the following:

(1) In the first and second embodiments, it is applied when the DIS is sent. Alternatively it may be applied when a DTS (send command signal digital command response to a standard function identified by the DIS) to attain the same effect.

(2) While 25% of the total capacity of the image memory is used as the threshold, a value other than 25% may be used or a threshold by byte may be used.

(3) The set and clear process of the sub-address control flag is the combination of FIGS. 3 and 4 in the first embodiment and the combination of FIGS. 5 and 6 in the second embodiment. alternatively, any combination may be used, for example, a combination of FIGS. 3 and 6 may be used.

In accordance with the first and second embodiments, when the remaining memory capacity to store the received image is small, the confidential reception, the relay designation reception or the like which uses the sub-address is not accepted so that the termination of the communication in error due to the shortage of the memory is prevented. Accordingly, the communication such as the confidential reception or the relay designation reception which uses the sub-address is carried out efficiently without waste.

In accordance with the second embodiment, when the memory becomes short (or overflows), the communication using the sub-address may be suspended until the memory becomes completely vacant. Thus, the memory shortage in the next successive communication may be prevented.

What is claimed is:

1. A communication apparatus having a function of performing a sub-address procedure to receive a sub-address signal, comprising:

sending means for sending to a destination information indicating whether or not said apparatus has the function of performing the sub-address procedure;

sub-address signal receiving means for receiving the sub-address signal from the destination in accordance with the sub-address procedure;

data receiving means for receiving data from the destination;

processing means for processing, in a case where said sending means has sent information to the destination indicating that said apparatus has the function of performing the sub-address procedure and where the sub-address signal is thereafter received in connection with data from the destination, the received data in accordance with the received sub-address signal; and control means for determining whether or not said processing means is able to perform the processing operation, and for causing said sending means to send information indicating that said apparatus does not have the function of performing the sub-address procedure to the destination in accordance with the determination of whether or not said processing means is able to perform the processing operation, said control means causing said apparatus to not accept data from the destination after said sending means sends the information indicating that said apparatus does not have the function of performing the sub-address procedure.

2. A communication apparatus according to claim 1, further comprising memory means for storing the data received by said data receiving means, wherein said processing means processes the data stored in said memory means in accordance with the sub-address signal received by said sub-address signal receiving means, and wherein said control means determines, on the basis of a remaining memory capacity of said memory means, whether or not said processing means is able to perform the processing operation.

3. A communication apparatus according to claim 2, wherein said processing means transfers the stored data to another destination.

4. A communication apparatus according to claim 2, wherein said memory means stores the received data separately from the sub-address signal.

5. A communication apparatus according to claim 2, wherein said processing means processes the stored data as confidential data.

6. A communication apparatus according to claim 2, wherein said control means determines, in a case where said memory means is full of data, that said processing means is not able to perform the processing operation, and determines, in a case where said memory means has a predetermined remained memory capacity, that said processing means is able to perform the processing operation.

7. A communication apparatus according to claim 1, wherein said data receiving means receives image data, and said processing means processes the received image data.

8. A communication apparatus according to claim 1, wherein said sub-address signal receiving means receives the sub-address signal in accordance with a facsimile communication procedure, and said data receiving means receives the data in accordance with the facsimile communication procedure.

9. A communication apparatus according to claim 1, wherein said sending means sends the information in a predetermined facsimile communication procedure signal.

10. A communication apparatus according to claim 9, wherein the predetermined facsimile communication procedure signal is a DIS signal of the ITU-T T.30 Recommendation.

11. A communication apparatus according to claim 9, wherein the predetermined facsimile communication procedure signal is a DCS signal of the ITU-T T.30 Recommendation.

12. A communication method in a communication apparatus having a function of performing a sub-address procedure to receive a sub-address signal, comprising the steps of:

sending, to a destination, information indicating whether or not said apparatus has the function of performing the sub-address procedure;

receiving the sub-address signal from the destination in accordance with the sub-address procedure;

receiving data from the destination;

processing, in a case where said sending step has sent information to the destination indicating that the apparatus has the function of performing the sub-address procedure and where the sub-address signal is thereafter received in connection with the data from the destination, the received data in accordance with the received sub-address signal;

determining whether or not the processing operation is able to be performed;

sending, to the destination, information indicating that said apparatus does not have the function of performing the sub-address procedure in accordance with a determination of whether or not the processing operation is able to be performed; and causing the apparatus to not accept data from the destination after the sending means sends the information indicating that the apparatus does not have the function of performing the sub-address procedure.

13. A communication method according to claim 12, further comprising a step of storing the received data in a memory, wherein said processing step processes the data stored in the memory in accordance with the received sub-address signal, and said determining step determines, on the basis of a remaining memory capacity of the memory, whether or not said processing step is able to perform the processing operation.

14. A communication method according to claim 13, wherein said processing step transfers the stored data to another destination.

15. A communication method according to claim 13, wherein said storing step stores the received data separately from the sub-address signal into the memory.

16. A communication method according to claim 13, wherein said processing step processes the stored data as confidential data.

17. A communication method according to claim 13, wherein said determining step determines, in a case where the memory is full of data, that said processing step is not able to perform the processing operation, and determines, in a case where the memory has a predetermined remained memory capacity, that said processing step is able to perform the processing operation.

18. A communication method according to claim 12, wherein the data is image data.

19. A communication method according to claim 12, wherein said sub-address signal receiving step receives the sub-address signal in accordance with a facsimile communication procedure, and said data receiving step receives the data in accordance with the facsimile communication procedure.

20. A communication method according to claim 12, wherein said sending step sends the information in a predetermined facsimile communication procedure signal.

21. A communication method according to claim 20 wherein the predetermined facsimile communication procedure signal is a DIS signal of the ITU-T T.30 Recommendation.

22. A communication method according to claim 20 wherein the predetermined facsimile communication procedure signal is a DCS signal of the ITU-T T.30 Recommendation.

* * * * *

UNITED STATES PATENT AND TRADEMARK OFFICE
CERTIFICATE OF CORRECTION

PATENT NO. : 5,742,402

DATED : April 21, 1998

INVENTOR(S) : MAKOTO KOBAYASHI ET AL.

It is certified that error appears in the above-identified patent and that said Letters Patent is hereby corrected as shown below:

COLUMN 6

Line 6, "remained" should read --remaining--.

COLUMN 8

Line 8, "claim 20" should read --claim 20,--; and
Line 12, "claim 20" should read --claim 20,--.

Signed and Sealed this

Fourth Day of May, 1999

Attest:

Q. TODD DICKINSON

Attesting Officer

Acting Commissioner of Patents and Trademarks